United States Patent [19]

Raymond Becky

[11] Patent Number: 4,462,069

[45] Date of Patent: Jul. 24, 1984

[54] D.C. TO D.C. VOLTAGE REGULATOR HAVING AN INPUT PROTECTION CIRCUIT, A D.C. TO D.C. INVERTER, A SATURABLE REACTOR REGULATOR, AND MAIN AND AUXILIARY RECTIFYING AND FILTERING CIRCUITS

[75] Inventor: Raymond Becky, McMurray, Pa.

[73] Assignee: American Standard Inc., Swissvale, Pa.

[21] Appl. No.: 293,042

[22] Filed: Aug. 14, 1981

[51] Int. Cl.³ .................................. H02P 13/22
[52] U.S. Cl. .................... 363/23; 361/56; 361/91; 363/49; 363/56; 363/91
[58] Field of Search .............. 363/15, 16, 22, 23, 363/28, 40, 49, 50, 55, 56, 82, 91, 95, 133, 21; 323/253, 281; 361/55, 56, 91

[56] References Cited

U.S. PATENT DOCUMENTS

| | | | |
|---|---|---|---|
| 2,968,738 | 1/1961 | Pintell. | |
| 3,049,632 | 8/1962 | Staples. | |
| 3,204,172 | 8/1965 | Darling et al. | |
| 3,341,765 | 9/1967 | Rogers et al. | |
| 3,355,653 | 11/1967 | Paradissis | 363/49 |
| 3,371,262 | 2/1968 | Bird et al. | |
| 3,414,798 | 12/1968 | Nielsen | 363/15 |
| 3,461,378 | 8/1969 | King. | |
| 3,601,680 | 8/1971 | Beckwith | 363/50 |
| 3,670,234 | 6/1972 | Joyce | 361/91 |
| 3,842,334 | 10/1974 | Franz | 363/16 |
| 4,023,071 | 5/1977 | Fussel | 361/56 |
| 4,024,437 | 5/1977 | Suzuki | 363/21 |
| 4,024,451 | 5/1977 | Nishino et al. | 363/55 |
| 4,067,054 | 1/1978 | Clark | 361/55 |
| 4,236,187 | 11/1980 | Mochizuki et al. | 361/91 |
| 4,321,525 | 3/1982 | Imazeki et al. | 323/281 |
| 4,334,267 | 6/1982 | Miko | 363/56 |

FOREIGN PATENT DOCUMENTS

| | | | |
|---|---|---|---|
| 52-60954 | 5/1977 | Japan | 363/23 |
| 419873 | 7/1974 | U.S.S.R. | 363/50 |

OTHER PUBLICATIONS

Electron, (G.B.), No. 83, pp. 23-25, 23 Oct. 1975, 56070-0010R.

Primary Examiner—William H. Beha, Jr.
Attorney, Agent, or Firm—J. B. Sotak

[57] ABSTRACT

A multiple output d.c. to d.c. regulating circuit including an input protection circuit for providing protection against input overcurrent, input transient voltages, sustained input overvoltage and input polarity reversal. The protection circuit powers a d.c. to a.c. inverter which generates high frequency square-wave signals. The square-wave signals are fed to a magnetic saturable reactor regulator which has its controlled windings connected by a rectifying filtering network to a pair of main output terminals and connected by transformer rectifier filter circuits to a plurality of auxiliary output terminals. The d.c. output voltage across the main output terminals is sampled and is compared to a reference voltage of an integrated circuit operational amplifier. The output of the integrated circuit operational amplifier is connected to the control winding of the saturable reactor for controlling the controlled windings so that the square-wave signals are pulse width modulated to regulate the d.c. voltages developed across the pair of main output terminals and the plurality of auxiliary output terminals. A soft starting circuit prevents high in-rushing currents from damaging the d.c. to a.c. inverter. An overload protection circuit senses overloads on the input and main output terminals and causes removal of power from the regulating circuit.

8 Claims, 2 Drawing Figures

D.C. TO D.C. VOLTAGE REGULATOR HAVING AN INPUT PROTECTION CIRCUIT, A D.C. TO D.C. INVERTER, A SATURABLE REACTOR REGULATOR, AND MAIN AND AUXILIARY RECTIFYING AND FILTERING CIRCUITS

FIELD OF THE INVENTION

This invention relates to a highly reliable direct current power supply and more particularly to an electronic d.c. to d.c. converter which includes an input voltage protection circuit, a self-excited square-wave d.c. to a.c. inverter circuit, a rectifier-filter and magnetic amplifer regulator circuit and a plurality of auxiliary rectifier and filter circuits for providing a d.c. voltage source for powering car-carried cab signal equipment.

BACKGROUND OF THE INVENTION

In a cab signal systems for railroad and mass and/or rapid transit operation, it is necessary to provide a suitable power supply for furnishing operating voltages to the electrical and electronic components and circuits. While there are many regulated power supplies in existance, these previous voltage sources were possessed of several shortcomings which made them unacceptable for use in car-carried cab signal apparatus. In some cases, the prior art power supplies were large, bulky, and heavy as well as very expensive to construct which detracted from their general acceptance in the transportation industry, particularly in mass and/or rapid transit systems. In addition, the reliability of some existing power supplies, mainly, switching types of regulated voltage supplies, does not fall within specification of the authoritative requirements. While linear and constant voltage transformer power supplies have an acceptable reliability, it has been found that such power supplies are not generally directly applicable for operation with a battery bus. In practice, these latter two types of power supplies must be preceded by a d.c. to a.c. inverter which results in the degradation of the reliability of the overall circuitry. Further, power supplies having a mean time between failures (MTBF) of nineteen thousand (19,000) hours have been considered to be an unacceptable rate of failure for cab signal equipment. Generally, the unacceptable MTBF rate was the result of the complexity and number of components used in previous switching regulator power supplies.

OBJECTS OF THE INVENTION

Accordingly, it is an object of this invention to provide a new and improved d.c. to d.c. regulated power supply having a high reliability.

A further object of this invention is to provide a highly reliable power supply employing a series connected magnetic amplifier or saturable reactor for rgulating an output voltage.

Another object of this invention is to provide a unique d.c. to d.c. switching converter having a plurality of regulated output voltages.

Yet a further object of this invention is to provide a novel switching regulated power supply having substantially high mean time between failures.

Yet another object of this invention is to provide an improved power supply having an input protection circuit, a d.c. to a.c inverting circuit, a magnetic amplifier regulating and filtering circuit, and auxiliary rectifying and filtering circuits for providing a multiple source of d.c. voltages.

Still another object of this invention is to provide a d.c. to d.c. voltage regulator having a pair of input terminals, a protection circuit including transient suppressing means connected to the pair of input terminals, a d.c. to a.c. inverting circuit connected to the output of the protection circuit, the d.c. to a.c. inverting circuit producing a.c. signals which are transformer coupled to the input of a saturable reactor regulating circuit, the saturable reactor regulating circuit, the saturable reactor regulating circuit having its output coupled to a pair of main output terminals by a rectifying circuit and coupled to a plurality of auxiliary output terminals by a transformer-rectifier circuit, and the saturable reactor regulating circuit having a sampling circuit coupled to the pair of main output terminals for sensing the output voltage and for controlling the saturable reactor regulating circuit whereby the output voltage across the pair of main output terminals as well as the output voltages across the plurality of auxiliary output terminals are maintained at a constant level.

Still a further object of this invention is to provide a new and improved power supply which is economical in cost, unique in design, reliable in operation, dependable in service, durable in use, efficient in performance, and simple in construction.

SUMMARY OF THE INVENTION

In accordance with the present invention, there is provided a d.c. to d.c. voltage regulating circuit including an input protection circuit, a d.c. to a.c. inverter circuit, a saturable reactor regulator and main auxiliary rectifying and filtering circuits. The input protection circuit includes an overcurrent circuit breaker device which is connected to a pair of d.c. voltage input terminals. The input protection circuit includes an L-C attenuating network, a varistor, and a PN silicon suppressor for absorbing the energy of transient voltages and includes a reverse protection diode for preventing damage due to reverse polarity connection of a source of the d.c. voltage across a pair of input terminals. The filtered d.c. voltage powers the d.c. to a.c. inverter which includes a saturable reactor transformer having a primary winding and a center-tapped secondary winding for driving a pair of push-pull oscillating transistors which produces square-wave output signals. The square-wave signals are fed to the input of a saturable reactor regulator which includes a control and controlled windings. The output of the saturable reactor regulator is coupled by a full-wave bridge rectifier and filter circuit to a pair of main output terminals and is transformer coupled to a plurality of full-wave recifiers and filters. The full-wave rectifiers and filters are connected to a plurality of auxiliary output terminals. A sampling circuit is connected across the pair of main output terminals for sensing the d.c. output voltage. The d.c. output voltage is compared to a reference voltage to control the output current of the integrated circuit operational amplifier. The output current is fed to a control winding of the saturable reactor regulator to cause the controlled windings to pulse width modulate the square-wave signals so that d.c. output voltages on the main and auxiliary terminals are held substantially constant. A soft starting circuit prevents high in-rushing currents from damaging the push-pull oscillating transistors. An overload protection circuit causes the removal of d.c.

power from the regulating circuit during sustained overload conditions.

DESCRIPTION OF THE DRAWINGS

The foregoing objects and other attendant features and advantages will become more readily understood and appreciated as the subject invention is described in further detail and is considered in conjunction with the accompanying drawings, wherein.

DETAILED DESCRIPTION OF THE INVENTION

Figure 1A:
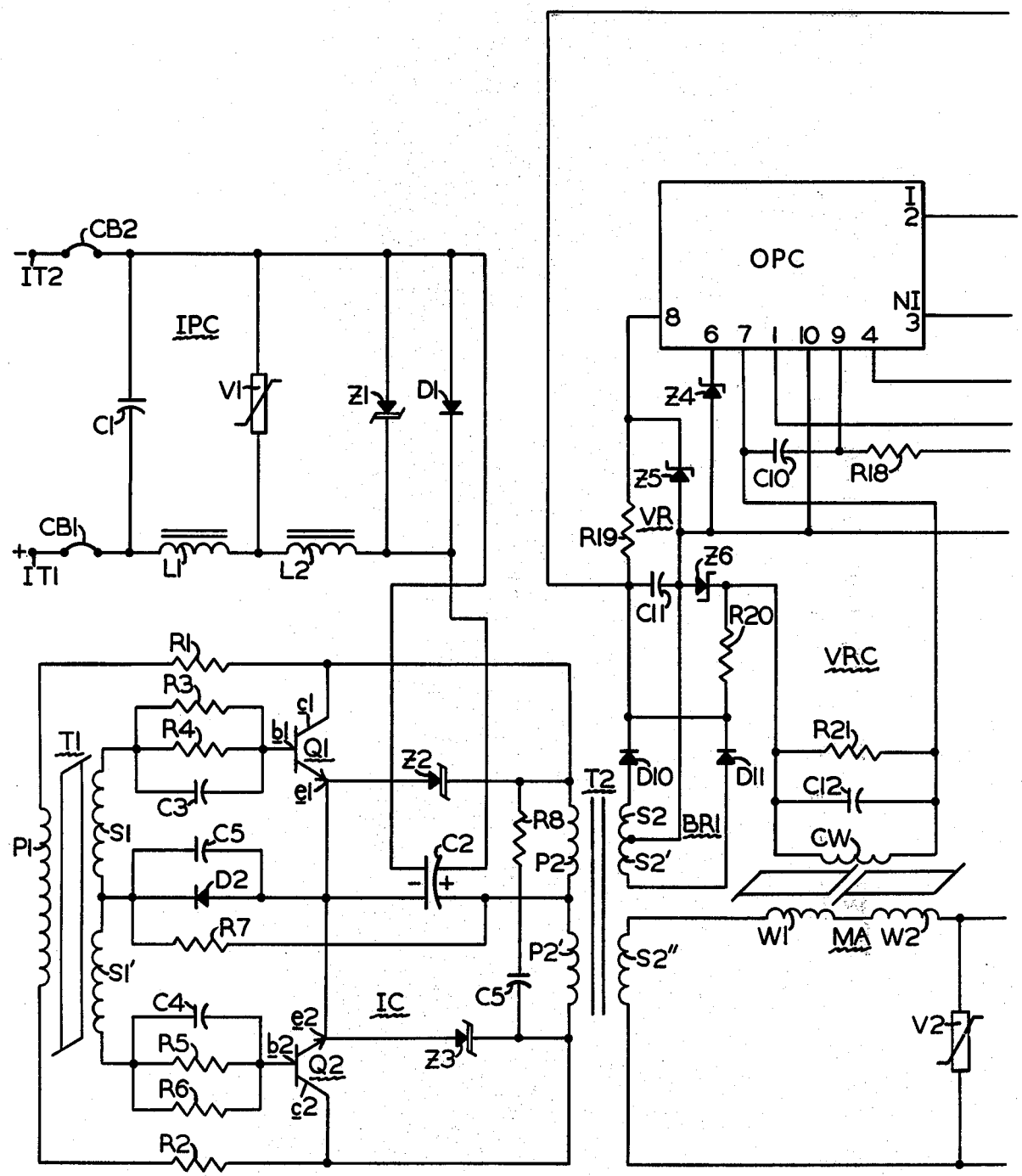
FIGS. 1A and 1B, when arranged side-by-side with FIG. 1A disposed on the left, make up a schematic circuit diagram illustrating a d.c. to d.c. switching voltage regulator circuit embodying the present invention.
Figure 1B:
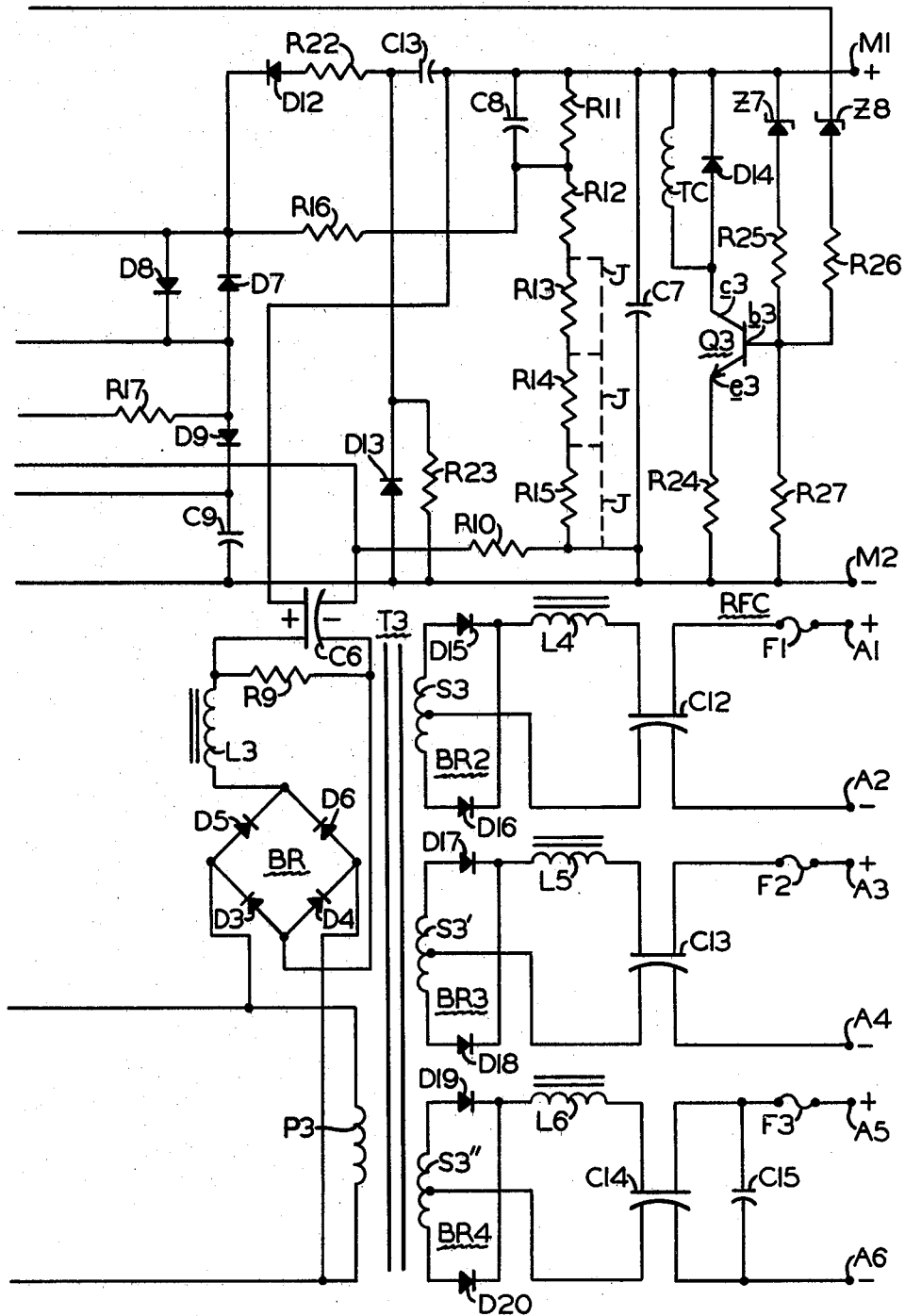

Referring now to the drawings, namely, FIGS. 1A and 1B, there is shown a relatively small, inexpensive, and highly reliable d.c. to d.c. voltage regulator for cab signal equipment. The d.c. voltage regulating circuit includes an input protection IPC, a d.c. to d.c. inverter circuit IC, a saturable reactor regulator circuit VRC, and main and auxiliary rectifying and filtering circuits RFC.

The input protection circuit IPC is connected to a pair of input terminals IT1 and IT2 of a suitable source of d.c. voltage (not shown) on board the railway vehicle. The protection circuit IPC is a two stage transient voltage suppressor which includes a pair of capacitors C1 and C2, a pair of inductors L1 and L2, a pair of diodes Z1 and D1, and a varistor V1. As shown, the positive input terminal IT1 is connected to the lower plate of filter capacitor C1 via circuit breaker contact CB1 while the negative input terminal IT2 is connected to the upper plate of capacitor C1 via circuit breaker contact CB2. The contacts CB1 and CB2 are ganged together and are opened by an electromagnetic coil when an overload condition exists as will be described in detail hereinafter. The inductor L has one end connected to the lower plate of capacitor C1 and has the other end connected to one end of inductor L2 and one end of varistor V1. The other end of varistor V1 is connected to the upper plate of capacitor C1 which is common with the anode electrodes of PN silicon transient voltage suppressor Z1 and diode D1 which are connected to the negative plate of capacitor C2. The suppressor Z1 is characterized by its phenomenal surge handling capabilities, extremely fast response time, and low series resistance, and may be of the type manufactured and sold by General Semiconductor Industries, Inc. The other end of inductor L2 is connected in common with the cathode electrodes of PN silicon transient voltage suppressor Z1 and diode D1 which are connected to the positive plate of capacitor C2. It will be appreciated that the protection circuit IPC includes components which provide safeguards against input overcurrent, transient input voltages, prolonged overvoltage, and voltage polarity reversal. The inductors L1 and L2 exhibit a high series impedance to fast rising transients and thereby enhance the clamping action of the voltage sensitive varistor V1 and diode Z1. Thus, the varistor V1 and suppressor Z1 and diode D1 will clamp the level of the input voltage spikes to a safe value, and the total energy absorbing capabilities of these electrical components is 55 joules, minimum. Further, it will be appreciated that the capacitor C2 will also absorb energy contained in the input voltage spikes. In addition to suppressing input voltage transients, the protection circuit IPC operates as a filter and attenuates the fundamental and harmonic components which are generated by the inverter circuit IC to prevent feedback to the battery bus.

It will be seen that the inverter circuit IC is powered by the voltage developed across the capacitor C2. The inverter circuit is a simple self-excited, square-wave saturating converter including a pair of PNP transistors Q1 and Q2. As shown, the transistor Q1 includes a base electrode $b_1$, a collector electrode $c_1$, and an emitter electrode $e_1$ while the transistor Q2 includes a base electrode $b_2$, a collector electrode $c_2$, and an emitter electrode $e_2$. It will be seen that the oscillating transistors Q1 and Q2 are driven by a saturable transformer T1 which includes a primary winding P1 and a pair of center-tapped secondary windings S1 and S1'. The frequency of oscillation of the converter is controlled by the volt-second characteristics of the transformer T1. In practice, the actual frequency will vary from 25 kilohertz to 40 kilohertz depending upon the input voltage and output loading. It will be noted that the collector electrode $c_1$ is connected to one end of primary winding P1 via current limiting resistor R1 while the collector electrode $c_2$ is connected to the other end of primary winding P1 via current limiting resistor R2. The resistors R1 and R2 limit the supply to transformer T2 during saturation. The base electrode $b_1$ is connected to the upper end of secondary winding S1 via parallel connected resistors R3, R4, and capacitor C3 while the base electrode $b_2$ is connected to the lower end of secondary winding S1' via parallel connected resistors R5, R6 and capacitor C4. The resistors R3 and R4 limit the current to the base electrode $b_1$ while the resistors R5 and R6 limit the current to base electrode $b_2$. The capacitor C5 and the diode D2 provide the necessary voltage for supplying the negative or reverse base turn-off current for the transistors. The emitter electrodes $e_1$ and $e_2$ are connected in common and are directly connected to the negative plate of the power supply capacitor C2. The emitter electrodes $e_1$ and $e_2$ are also connected to the center tap of secondary windings S1 and S2 via parallel connected diode D2 and capacitor C5. A starting bias resistor R7 is connected between the positive plate of supply capacitor C2 and the center tap of secondary windings S1 and S1'. As shown, the collector electrodes $c_1$ and $c_2$ are also connected to the respective ends of an output transformer T2 which includes a pair of center-tapped primary windings P2 and P2' and a pair of center-tapped secondary windings S2 and S2' as well as a secondary winding S2". The emitter electrodes $e_1$ and $e_2$ are connected to the respective ends of the center-tapped primary windings P2 and P2' via PN silicon transient voltage suppressors Z2 and Z3 which protect transistors Q1 and Q by suppressing excessive voltage transients. A serially connected resistor R and capacitor C5 are connected across primary windings P2 and P2' and form a snubber circuit to limit the high voltage spikes on the collector electrodes $c_1$ and $c_2$.

As shown, the secondary winding S2" supplies the a.c. voltage for the main and auxiliary rectifier and filter circuits which produce the d.c. output voltages. The upper end of secondary winding S2" is connected to the series connected magnetic amplifier MA while the lower end of secondary winding S2" is the common lead. The magnetic amplifier MA consists of two-match saturable cores, each having a toroidal controlled winding. The controlled winding W1 is wound about a first circular core while the control winding W2 is wound about a second circular core. The windings W1 and W2 are connected in series opposition. A control winding CW is wound over both of the cores and controls the conduction angle of the a.c. voltage by varying the saturation characteristics of the magnetic cores. As shown, a transient suppressing varistor V2 and a primary winding P3 of an output transformer T3 are connected from winding W2 and the common lead. A full-wave bridge rectifier network BR including diodes D3, D4, D5, and D6 is connected across the output of the magnetic amplifier MA. Thus, the firing angle of the a.c. voltage appearing at the bridge rectifier BR may be controlled so that when the input current to the control winding CW is zero, the impedance exhibited by the windings W1 and W2 is at a maximum value. Thus, when the impedance is maximum, the output voltage is at minimum value. Now when the current in the control winding CW increases, the width of the negative and positive voltage pulses appearing at the input of the bridge rectifier BR will increase. Accordingly, the magnetic amplifier MA operates as a d.c. current controlled pulse width modulator.

It will be seen that the current in the control winding CW is increased and decreased by an integrated circuit operational amplifier comparator OPC which senses and monitors the d.c. voltage level developed across the main output terminals M1 and M2. As shown, the positive output terminal of the bridge rectifier BR is connected by an inductor L3 to a filter network including resistor R9 and four-terminal capacitor C6 which, in turn, are connected to the negative output terminal of the bridge rectifier BR. The positive plate of filter capacitor C6 is directly connected to d.c. output terminal M1 while the negative plate of capacitor C6 is connected to the d.c. output terminal M2 via a current sensing resistor R10. A variable voltage dividing network including resistors R11, R12, R13, R14, and R15 is connected across the main output terminals M1 and M2. A filter capacitor C7 is connected across the voltage dividing network. Since the reference voltage may vary slightly, it is necessary to provide some method of calibrating the output voltage. The use of a potentiometer was avoided because of its poor reliability. The resistors R13, R14, and R15 are provided with jumpers J, as shown by the dashed lines which may be selectively inserted or removed to shunt or add any of the three resistors to the voltage dividing network. In practice, the resistors R13, R14, and R15 are mounted on standoff terminals which provide sufficient space for accommodating a resistor and a jumper bus. Thus, the resistors may be shorted out one at a time until the correct voltage is produced on the main output terminals M1 and M2. A bypass capacitor C8 is connected in parallel with the resistor R11. The output voltage is sampled by the voltage divider and is applied to the inverting terminal 2 of the integrated circuit OPC via resistor R16 which is connected to the junction point of resistors R11 and R12. The sampled voltage is compared to a reference voltage which is internally generated by the integrated circuit operational amplifier OPC on terminal 4 and convey to noninverting terminal 3 via resistor R17. A pair of reversely poled parallel diodes D7 and D8 protect the input stage of the intergrated circuit operational amplifier OPC by limiting the differential voltage appearing across the inverting and noninverting terminals 2 and 3. It has been found that a latching condition occurs if the inverting input terminal 3 of the operational amplifier OPC exceeds a positive 8 volts. In order to prevent this quirk of the operational amplifier OPC, a clamping diode D9 is connected to terminal 3 to prevent this condition. A feedback loop including resistor R18 and C9 is connected between terminals 9 and 10. A zener diode Z4 is connected to terminal 6 to provide the proper internal biasing for the operational amplifier. A capacitor C10 is connected between terminals 7 and 9 to prevent the generation of spurious high frequency oscillations in the final output stage of the operational amplifier OPC. It will be seen that the center-tapped secondary windings S and S' are connected to a full-wave rectifier BR1 including diodes D10 and D11. A filter capacitor C11 removes the ripple component from the d.c. output voltage of the bridge rectifier BR1. A voltage regulator VR including a series resistor R19 and a shunt zener diode Z5 regulate and limit the d.c. voltage appearing on terminal 8 and supplied to the reference voltage generator of the operational amplifier OPC. A zener diode Z6 is used to limit the voltage on the output stage of the operational amplifier OPC during a transient condition while the resistor R20 limits the energy dissipation of the zener diode Z6 during the transient condition. As shown, a filter capacitor C12 and a bleeder resistor R21 are connected across the control winding CW.

It will be seen that a soft starting circuit has been incorporated in the subject power supply in order to prevent high in-rushing currents from damaging the transistors Q1 and Q2. The starting circuit includes a capacitor C13, a resistor R22, and a diode D12 serially connected to the inverting input terminal 2 of the operational amplifier OPC. A diode D12 and a parallel-connected resistor R23 are connected from the junction point of capacitor C13 and resistor R22 to the negative output terminal M1. Thus, when a voltage appears at the junction of capacitor C8 and resistor R11, a charging current begins to flow through capacitor C13. The current being fed to the inverting terminal 2 is limited by the resistor R12. The R-C time constant of capacitor C13 and resistor R23 determines the rate of rise of the d.c. output voltage at the startup. When capacitor C13 becomes fully charged, the voltage at the anode electrode of diode D12 is very small and, in fact, is equal to the leakage current of capacitor C13 times 100K ohms. However, the voltage at the cathode electrode of diode D12 is at approximately 7 volts and, therefore, the diode D12 is back biased and is turned off. Thus, the diode D12 effectively functions as a switch to remove the starting circuit from further operation. It will be seen that the diode D13 provides a quick discharge path for the capacitor C13 when the output voltage goes toward a zero value.

The power supply is protected against sustained input overloads as well as against excessive output overloads developed across the main terminals M1 and M2. These two overload functions cause the removal of the power supply from the battery bus. It will be seen that the circuit breaker contacts CB1 and CB2 are actuated by a trip winding or coil TC which is energized by the conduction of an NPN transistor Q3. The transistor Q3 includes a base electrode b3, a collector electrode c3, and an emitter electrode e3. As shown, one end of the trip coil is connected to the positive output terminal M1 while the other end is connected to the collector electrode c3. A spike suppressing diode D14 is connected across the trip coil TC to dampen the reactive voltage which occurs during the collapse of the magnetic field of the coil TC. The emitter electrode e3 is connected to the negative output terminal M2 via resistor R24. The base electrode b3 of the switching transistor Q3 is connected to a two-input OR gate which is made of a zener diode Z7 and resistors R25 and R27 or zener diode Z8 and resistors R26 and R27. As shown, the base electrode b3 is connected to a junction point formed between resistor R27 and resistors R25 and R26. The lower end of resistor R27 is connected to the negative output terminal M2 while the upper end of resistor R25 is connected to the positive output terminal M1 via zener diode 27. The upper end of resistor R26 is connected to the positive plate of capacitor C11 via zener diode Z8. It will be appreciated that the d.c. voltage and the positive plate of capacitor C11 are directly proportional to the input battery bus and, therefore, the voltage on the capacitor C11 can be employed to sense the magnitude of the d.c. voltage on input terminals IT1 and IT2. Thus, a sustained overvoltage condition on terminals IT1 and IT2 is reflected on capacitor C11 which will result in the conduction of zener diode Z8. The conduction of zener diode Z8 causes base drive current to flow into electrode b3 which causes the conduction of transistor Q3. The turning ON of the transistor Q3 causes the energization of the trip coil TC which, in turn, results in the opening of the circuit breaker contacts CB1 and CB2. Thus, the d.c. input voltage is removed from the power supply during an input overvoltage condition. Conversely, during a sustained output overvoltage condition, the transistor Q3 is rendered conductive by the conduction of zener diode Z7 which supplies the drive current to the base electrode b3. It will be appreciated that the inherent time delays which are associated with circuit breakers will prevent nuisance trips by the appearance of short term transients.

Turning now to the auxiliary d.c. output voltages, it will be seen that the output transformer T3 includes three center-tapped secondary windings S3, S3', and S3".

As shown, the secondary winding S3 is connected to a full-wave rectifier network BR2 which includes diodes D15 and D16. The rectified voltage is conveyed to the d.c. output terminals via inductor L4, four-terminal capacitor C12 and fuse F1. Similarly, secondary winding S3' is connected to a full-wave rectifier network BR3 which includes diodes D17 and D18. The rectified voltage is conveyed to the d.c. output terminals via inductor L5, four-terminal capacitor C13, and fuse F2. In a like manner, the secondary winding S3" is connected to a full-wave rectifier network BR4 which includes diodes D19 and D20. The rectified voltage is conveyed to the output terminals A5 and A6 via inductor L6, four-terminal capacitor C14, storage capacitor C15, and fuse F3. Thus, the pulse width modulated a.c. square-wave signals appearing at the input of the bridge rectifier BR are also fed to the output transformer T3. The primary winding P3 transformer couples the signals to the secondary windings S3, S3', and S3". The induced voltages are rectified and filtered to provide three auxiliary sources of d.c. voltage. As noted above, the auxiliary circuits are fuse protected. It will be appreciated in the presently described multiple output power supply that only the main d.c. output is sampled for regulation purposes. Therefore, the regulation of the auxiliary output is dependent upon the circuit conditions affecting the main output.

It will be appreciated that while the present invention finds particularly utility in car-carried cab signal equipment, it is readily understood that the presently described power supply may be used in other fields which require multiple voltage sources. Further, it will be understood that regardless of the manner in which the invention is employed, it is apparent that various changes and modifications may be made by persons skilled in the art without departing from the spirit and scope of the present invention. Thus, it will be appreciated that all variations, alterations, and equivalents falling within the bounds of the present invention are herein meant to be included in the appended claims.

Having thus described the invention, what I claim as new and desire to be secured by Letters Patent, is:

1. A d.c. to d.c. voltage regulator comprising, a pair of input terminals connectable to a source of d.c. voltage, a protection circuit including transient suppressing means connected to said pair of input terminals, a d.c. to a.c. inverting circuit connected to the output of said protection circuit, said d.c. to a.c. inverting circuit producing a.c. signals which are transformer coupled to the input of a saturable reactor regulating circuit, said saturable reactor regulating circuit having its output coupled to a pair of main output terminals by a rectifying circuit and coupled to a plurality of auxiliary output terminals by a transformer rectifying circuit, and said saturable reactor regulating circuit having a sampling circuit coupled to said pair of main output terminals for sensing the output voltage and for controlling said saturable reactor regulating circuit whereby the output voltage across said pair of main output terminals as well as the output voltages across the plurality of auxiliary output terminals are maintained at a constant level, and an overvoltage protection circuit including a switching transistor and a two-input OR gate, said two-input OR gate includes a first zener diode and pair of resistors for sensing an overvoltage condition across said pair of input terminals and includes a second zener diode and pair of resistors for sensing an overvoltage condition across said pair of main output terminals and for rendering said switching transistor conductive to energize a circuit breaker which opens electrical contacts connected to said pair of input terminals for deenergizing the d.c. to d.c. voltage regulator when an overvoltage condition exists across said pair of input terminals or exists across said pair of output terminals.

2. The d.c. to d.c. voltage regulator as defined in claim 1, wherein said protection circuit includes an L-C network, a varistor and a suppressor for absorbing the energy of transient voltages and includes a reverse voltage protection diode for preventing damage due to reverse polarity connection of the source of d.c. voltage across said pair of said input terminals.

3. The d.c. to d.c. voltage regulator as defined in claim 1, wherein said d.c. to a.c. inverting circuit includes a saturable reactor transformer having a primary winding and a center-tapped secondary winding for driving a pair of push-pull oscillating transistors which produce square-wave output signals.

4. The d.c. to d.c. voltage regulator as defined in claim 1, wherein said d.c. to a.c. inverting circuit is connected to the output of said protection circuit by a four-terminal capacitor which supplies operating potential to said d.c. to a.c. inverting circuit.

5. The d.c. to d.c. voltage regulator as defined in claim 1, wherein said saturable reactor regulating circuit includes a pair of cores and controlled windings and a control winding.

6. The d.c. to a.c. voltage regulator as defined in claim 1, wherein said sampling circuit includes an integrated circuit operation amplifier which compares the output voltage developed across said pair of main output terminals with a reference voltage to control the current to said control windings.

7. The d.c. to d.c. voltage regulator as defined in claim 1, wherein a soft starting circuit is connected to said sampling circuit for controlling said sampling circuit upon start-up to prevent high in-rushing surges from damaging said d.c. to a.c. inverting circuit.

8. The d.c. to d.c. voltage regulator as defined in claim 6, wherein a voltage divider includes a plurality of resistors which may be shorted to provide a calibration of the output voltage developed across said pair of main output terminals with the reference voltage.

* * * * *

UNITED STATES PATENT OFFICE
CERTIFICATE OF CORRECTION

PATENT NO. : 4,462,069
DATED : July 24, 1984
INVENTOR(S) : Raymond Becky

It is certified that error appears in the above-identified patent and that said Letters Patent are hereby corrected as shown below:

Column 9, line 1, change "a.c." to --d.c.--

Signed and Sealed this

Sixteenth Day of April 1985

[SEAL]

Attest:

DONALD J. QUIGG

Attesting Officer  Acting Commissioner of Patents and Trademarks